United States Patent [19]

Miyaoka et al.

[11] Patent Number: 5,040,428
[45] Date of Patent: Aug. 20, 1991

[54] SWING REDUCTION GEAR ASSEMBLY

[75] Inventors: Satoshi Miyaoka; Shingo Kobayashi, both of Hiroshima, Japan

[73] Assignee: Kabushiki Kaisha Kobe Seiko Sho, Kobe, Japan

[21] Appl. No.: 494,314

[22] Filed: Mar. 16, 1990

[30] Foreign Application Priority Data

Mar. 23, 1989 [JP] Japan .................................. 1-73576

[51] Int. Cl.$^5$ .......................... F16H 1/10; F16H 57/04
[52] U.S. Cl. ................................. 74/421 A; 74/421 R; 74/467; 414/687; 212/247; 212/248
[58] Field of Search ................. 74/421 R, 421 A, 467; 277/25, 133, 134, 152, 153; 384/478; 414/687; 212/247, 248

[56] References Cited

U.S. PATENT DOCUMENTS

| | | | |
|---|---|---|---|
| 2,405,981 | 8/1946 | Schield | 212/247 X |
| 3,452,624 | 7/1969 | Lorence | 212/247 X |
| 3,811,577 | 5/1974 | Yancey | 74/467 X |
| 3,990,539 | 11/1976 | Marit | 212/247 X |
| 4,656,885 | 4/1987 | Hori et al. | 74/467 |
| 4,677,871 | 7/1987 | Taniyama et al. | 74/467 |
| 4,797,060 | 1/1989 | Kishi et al. | 414/687 |
| 4,928,979 | 5/1990 | Nagasawa | 277/134 X |

Primary Examiner—Allan D. Herrmann
Assistant Examiner—Julie Krolikowski
Attorney, Agent, or Firm—Oblon, Spivak, McClelland, Maier & Neustadt

[57] ABSTRACT

A swing reduction gear assembly for a swing device which prevents admission of grease into the same and in which the pressing force of grease squeezed out from between mutually meshing teeth of a pinion and an internal gear wheel thereof is reduced. The swing reduction gear assembly comprises a lower bearing for supporting an output shaft for rotation on a casing, a sealing collar fitted on an outer periphery of the output shaft and located above a pinion integrated with the output shaft, a retainer mounted on the casing below the lower bearing, and an oil seal fitted around the retainer and normally held in engagement with an outer periphery of the sealing collar. The oil seal has a lower face side lip portion formed thereon, and a disk-shaped plate is mounted on an outer periphery of the sealing collar such that the lower face side lip portion of the oil seal is normally held in contact with an upper face of the disk-shaped plate to prevent oil from entering the swing reduction gear drive.

2 Claims, 6 Drawing Sheets

SWING REDUCTION GEAR ASSEMBLY

BACKGROUND OF THE INVENTION

1. Field of the Invention

This invention relates to a structure of a swing reduction gear assembly for use with a construction equipment of the upper structure revolving type, a cargo handling equipment and so forth.

2. Description of the Related Art

A swing reduction gear assembly of the type mentioned is conventionally installed, for example, in such a hydraulic shovel as shown FIG. 7. Referring to FIG. 7, the hydraulic shovel includes a lower structure 1, a swing bearing 2, an upper structure 3, and a swing reduction gear drive 4 mounted on the upper structure 3. The upper structure 3 is mounted for swinging motion on the lower structure 1 by means of, for example, such a swing device as shown in FIG. 8.

Referring to FIG. 8, the swing device generally denoted at 5 is composed of a lower face plate 6 of the upper structure 3, an outer race 8 and an inner race 10 of the swing bearing 2, an upper face plate 9 of the lower structure 1, and rolling bodies 13 of the swing bearing 2 such as steel balls interposed between the outer race 8 and the inner race 10 of the swing bearing 2.

The outer race 8 of the swing bearing 2 is securely mounted on a lower face of the lower face plate 6 of the upper structure 3 while the inner race 10 of the swing bearing 2 is securely mounted on the upper face plate 9 of the lower structure 1, and the outer and inner races 8 and 10 of the swing bearing 2 are assembled for rotation relative to each other by way of the rolling bodies 13. An internal gear wheel 11 is formed on an inner periphery of the inner race 10, and an oil tank 12 is formed between the internal gear wheel 11 and a central upper projection of a plate b secured to the upper face plate 9 of the lower structure 1 and is filled with oil for the lubrication of teeth of the internal gear wheel 11 and a pinion 7 of thw swing reduction gear drive 4. The swing reduction gear drive 4 is mounted on the lower face plate 6 of the upper structure 3 and the pinion 7 thereof is held in meshing engagement with the internal gear wheel 11 of the swing bearing 2. Consequently, when the pinion 7 is rotated, the upper structure 3 is swung by a reactive force to the force of rotation.

A relationship between the swing bearing 2 and the swing reduction gear drive 4 is shown more particularly in FIG. 9 which is an enlarged view substantially of an encircled, portion A of FIG. 8. Referring to FIG. 9, a sealing collar 15 is secured to a lower bearing 14 which is secured in turn to a casing body of the swing reduction gear drive 4. A retainer 17 is securely mounted at a lower end of the casing body 16 by means of a plurality of bolts 18 (only one is shown), and an oil seal 19 is fitted on an inner periphery of the retainer 17. The oil seal 19 has a lip portion 20 normally held in engagement with an outer periphery of the sealing collar 15. A liner member 21 is interposed between the lower bearing 14 and the retainer 17. A seal member 22 is fitted in an annular groove formed on an inner periphery of the sealing collar 15.

An output shaft a of the swing reduction gear 4 is supported for rotation around an axial line 0—0 on the casing body 16 by means of an upper bearing and the lower bearing 14, and the pinion 7 is integrated with the lower end of the output shaft a of the swing reduction gear drive 4.

Since the retainer 17 on which the oil seal 19 is fitted is securely mounted at the lower end of the casing body 16, the oil seal 19 is mounted on the upper structure 3 side. Meanwhile, since the sealing collar 15 on the upper face side of the pinion 7 is fitted on the output shaft a integrated with the pinion 7, it is rotated in an integrated relationship with the pinion 7. Since the sealing collar 15 is held in close contact over the entire outer periphery thereof with the lip portion 20 of the oil seal 19 and the seal member 22 is provided on the inner periphery of the sealing collar 15, leakage of lubricating oil from within the swing reduction gear drive 4 is prevented by them.

In the structure described above, starting and stopping of swinging motion of the upper structure 3, which is great in weight and hence in inertia, are entirely carried out through meshing engagement between the pinion 7 and the internal gear wheel 11 of the inner race 10. Consequently, a high load is applied to faces of mutually contacting teeth of the pinion 7 and the internal gear wheel 11. Besides, the faces of mutually contacting teeth are slidably moved relative to each other. Thus, in order to assure a high degree durability of the tooth faces the annular oil tank 12 is formed between the internal gear wheel 11 of the inner race 10 and the plate b and a suitable amount of oil is filled in the oil tank 12 to lubricate the tooth faces.

Meanwhile, the output shaft a of the swing reduction gear drive 4 is supported by means of the upper bearing and the lower bearing 14, and the inside of the swing reduction gear drive 4 including the bearings is held in a sealed condition and internal components therein are lubricated with a different lubricating oil. Therefore, the oil seal 19 is provided between the retainer 17 at the lower portion of the swing reduction gear drive 4 and the output shaft a which rotates in order to prevent flowing out of the lubricating oil from the swing reduction gear 4 and admission of foreign particles into the swing reduction gear drive 4 from the outside.

In the swing device described above, the oil seal and the pinion are located at comparatively near locations relative to each other in order to assure a high strength of the output shaft of the swing reduction gear. Further, since the pinion and the internal gear wheel are held in meshing engagement with each other in the oil tank filled with oil, such oil will be squeezed out from between mutually contacting teeth of the pinion and the internal gear wheel.

Then, the oil squeezed out to the oil seal side may push open the dust lip and the seal lip of the oil seal and be admitted into the casing of the swing reduction gear drive. Consequently, the oil from the gear teeth may be mixed with the lubricating oil in the swing reduction gear drive, which will deteriorate the performance of the lubricating oil. Further, as a result of such admission of the oil, the oil in the swing reduction drive will be increased in amount and may thus be spouted to the outside by way of an oil level gage hole or some other opening portions of the casing, which will have a bad influence on the swing reduction gear drive.

SUMMARY OF THE INVENTION

It is an object of the present invention to provide a swing reduction gear assembly for a swing device which prevents admission of external oil into the same.

It is another object of the present invention to provide a swing reduction gear assembly for a swing device which has a reduced effect of pressing oil squeezed out from between mutually meshing teeth of a pinion and an internal gear wheel thereof.

In order to attain the objects, according to the present invention, there is provided a swing reduction gear assembly for a swing device wherein an upper structure on which the swing reduction gear drive is mounted for swinging movement by way of a swing bearing on a lower structure on which an inner race of the swing bearing is mounted, and a pinion of the swing reduction gear drive and an internal gear wheel formed on the inner race of the swing bearing are held in meshing engagement with each other in a tank for oil for the lubrication of the swing reduction gear assembly, the swing reduction gear comprising a casing, an output shaft integrated at a lower end thereof with the pinion, a lower bearing for supporting the output shaft for rotation on the casing, a sealing collar fitted on an outer periphery of the output shaft and located on the upper face side of the pinion, a retainer mounted on the casing on the lower side of the lower bearing, an oil seal fitted on an inner periphery of the retainer and normally held in engagement with an outer periphery of the sealing collar, the oil seal having a lower face side lip portion formed thereon, and a disk-shaped plate mounted on an outer periphery of the sealing collar such that the lower face side lip portion of the oil seal is normally held in contact with an upper face of the disk-shaped plate.

With the swing reduction gear assembly, the pressing force of oil squeezed out from between mutually cooperating teeth of the pinion and the internal gear wheel when they are rotated in a mutually meshing condition acts upon the lower face side lip portion of the oil seal. However, since the lower face side lip portion of the oil seal is held in contact with and hence slidably moved on the upper face of the disk-shaped plate, it acts so as to prevent the oil from entering the swing reduction gear drive. Accordingly, admission of the oil into the swing reduction gear drive is prevented.

The retainer may have an oil passage formed at a lower end portion thereof for passing therethrough part of the oil which is squeezed out from between cooperating teeth of the pinion and the internal gear wheel. Since the position at which the oil is squeezed out is a predetermined fixed location with respect to the swing reduction gear, the oil passage is formed at a location of the lower end portion of the retainer which is spaced a little from the predetermined fixed location. Consequently, part of the oil squeezed out will pass through the oil passage from the lower face side of the oil seal and is returned into the oil tank. As a result, the pressing force of the oil squeezed out as described above is reduced, and admission of the oil into the swing reduction gear drive is prevented more effectively.

The sealing collar may have an oil passage formed at an inner periphery of a lower end thereof for passing therethrough part of the oil which is squeezed out from between cooperating teeth of the pinion and the internal gear wheel. Thus, oil squeezed out to the lower face side of the sealing collar upon rotation of the pinion and the internal gear wheel will pass the upper face side of the pinion and, passing between teeth of the pinion which are not in a meshing condition, is returned into the oil tank. Consequently, the pressing force of oil squeezed out as described above is decreased, and admission of the grease into the swing reduction gear drive is prevented effectively.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENT

Figure 1:
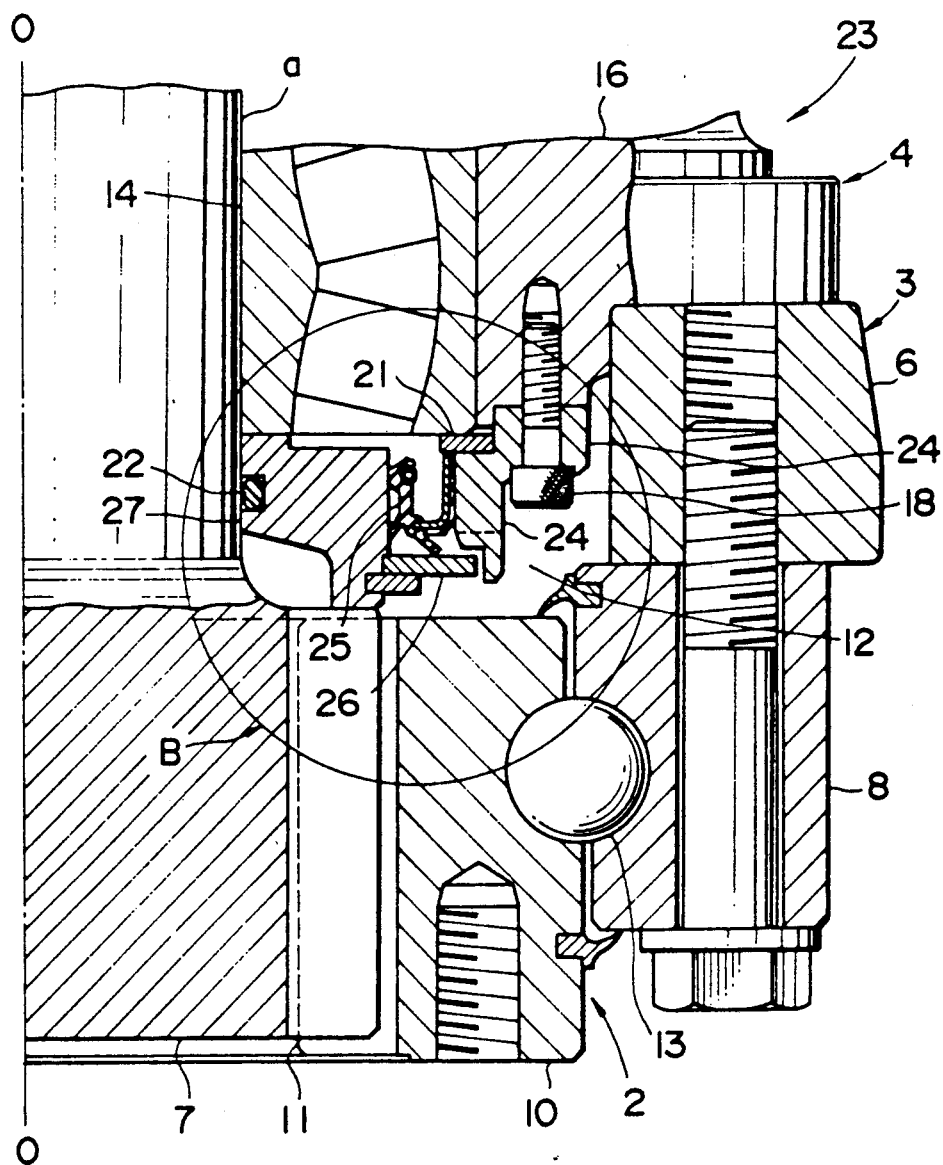
FIG. 1 is a sectional view of part of a swing reduction gear assembly according to the present invention.

Referring first to FIG. 1, there is shown a swing reduction gear assembly for a swing device according to the present invention. The swing reduction gear assembly has somewhat common structure to that of the conventional swing reduction gear assembly shown in FIG. 9, and like parts are denoted by like reference numerals to those of FIG. 9 and overlapping description thereof is omitted herein.

Figure 9:
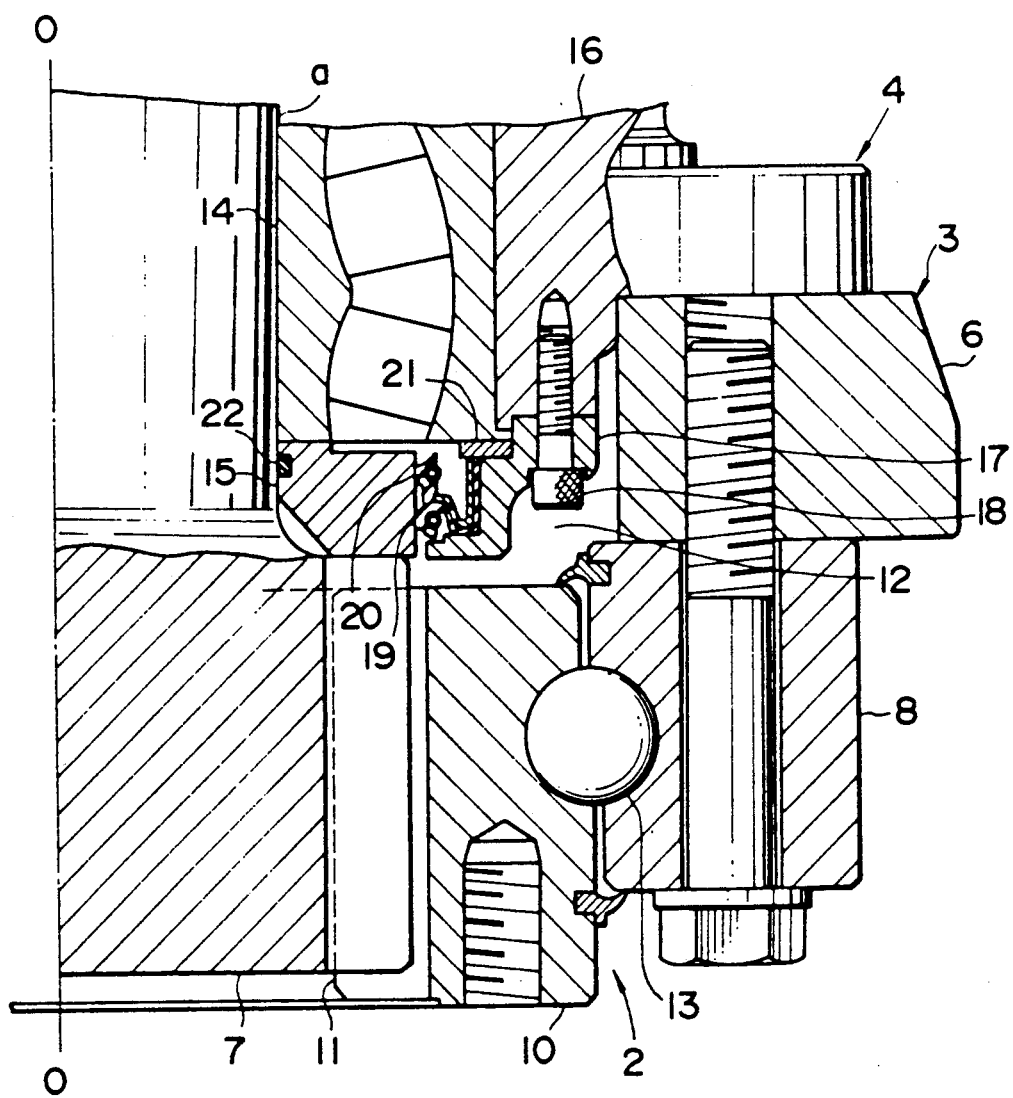
FIG. 9 is an enlarged sectional view of an encircled portion A of FIG. 8.

The swing reduction gear drive is generally denoted at 23 and includes a retainer 24, an oil seal 25 and a sealing collar 27 which are modifications of the retainer 17, oil seal 19 and sealing collar 15, respectively, of the conventional swing reduction gear assembly shown in FIG. 9. The swing reduction gear drive 23 additionally includes a disk-shaped plate 26. The retainer 24, sealing collar 27 and disk-shaped plate 26 are individually shown in FIGS. 2, 3 and 4, respectively, while an encircled portion B of FIG. 1 in which those elements are included is shown in more detail in FIG. 5.

Figure 5:
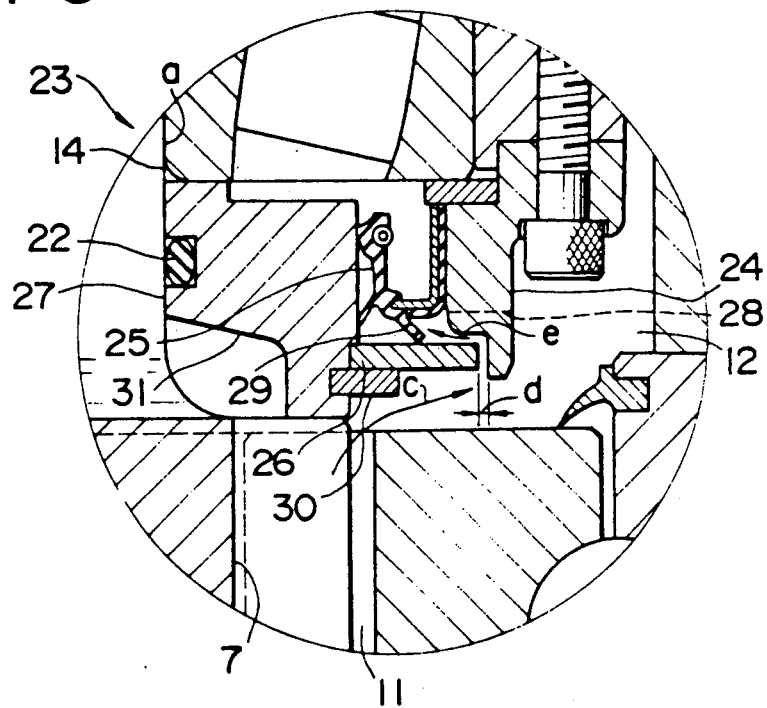
FIG. 5 is an enlarged sectional view of an encircled portion B of FIG. 1.
Figure 6:
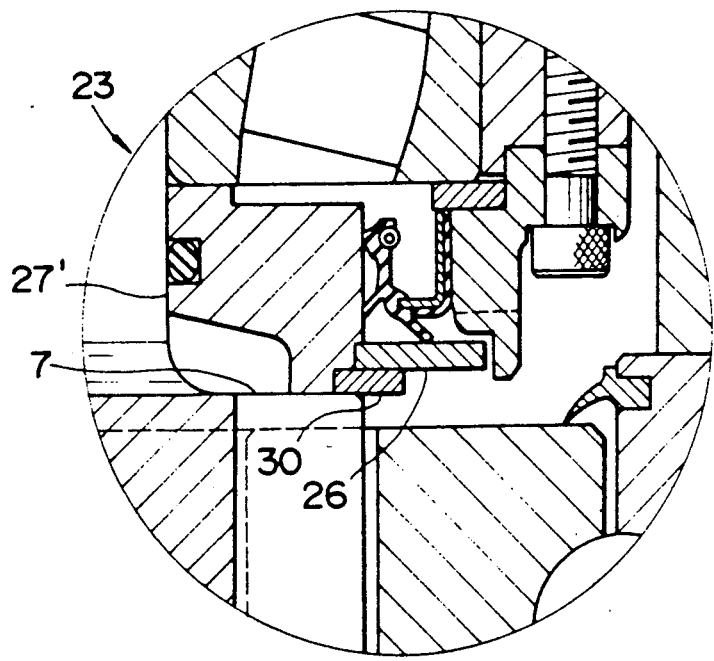
FIG. 6 is a similar view but showing a modified swing reduction gear assembly.
Figure 7:
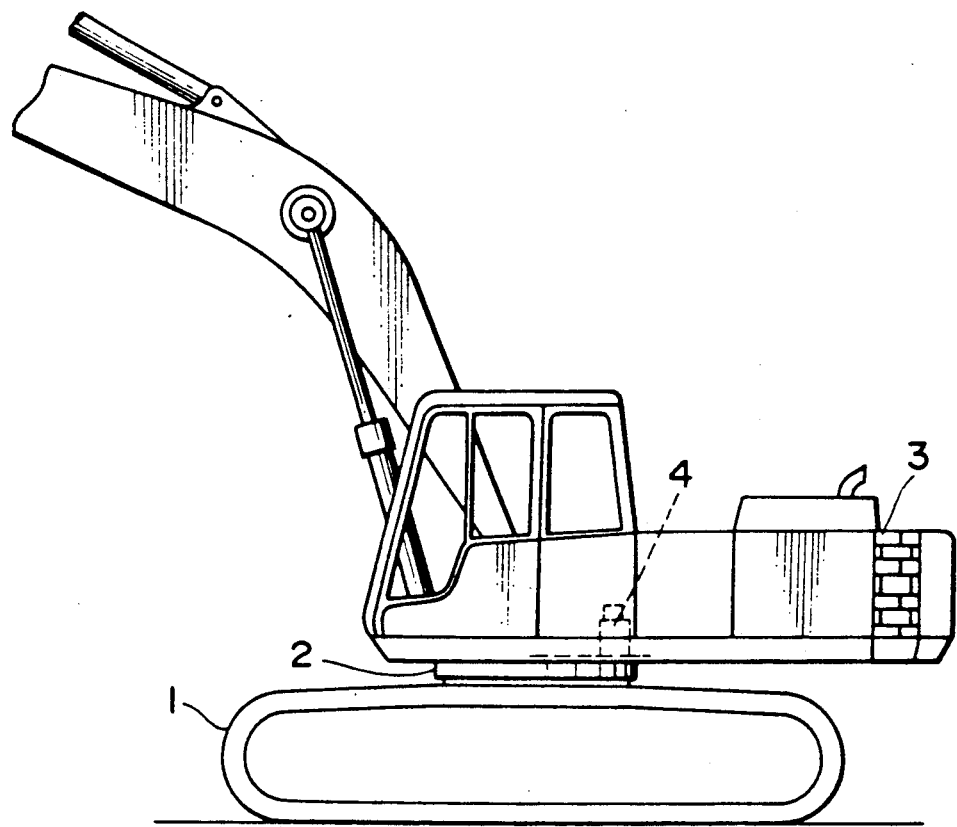
FIG. 7 is a side elevational view of a common hydraulic shovel.
Figure 8:
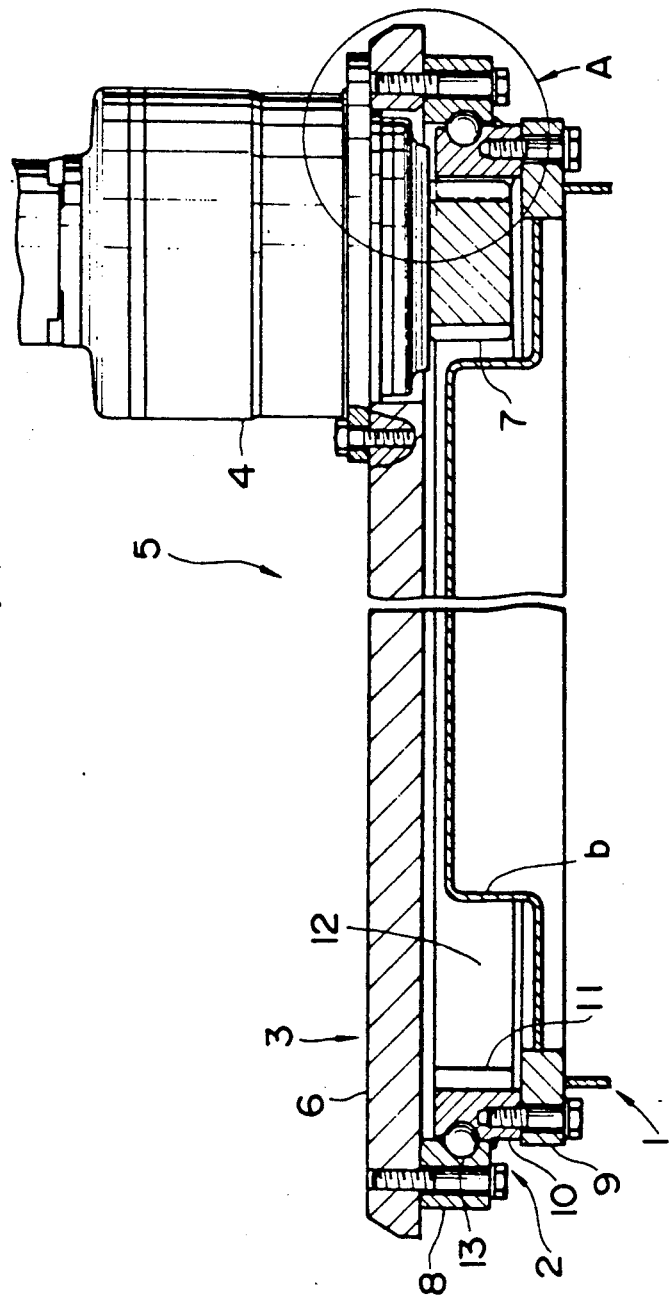
FIG. 8 is a vertical sectional view showing an exemplary one of conventional swing devices.

Referring to FIG. 5, the modified oil seal 25 has a lower face side lip portion 29 and is fitted on an inner periphery of the retainer 24 which is mounted on the lower side of the lower bearing 14. The disk-shaped plate 26 is secured to the sealing collar 27 above a pinion 7 by means of a stop ring 30 such that the lower face side lip portion 29 of the oil seal 25 is held in contact with an upper face of the disk-shaped plate 26. In this instance, the stop ring 30 may be secured in a different manner. For example, referring to FIG. 6, the stop ring 30 may be secured between a lower end portion adjacent an outer periphery of a modified sealing collar 27' and an upper face of the pinion 7.

Figure 2:
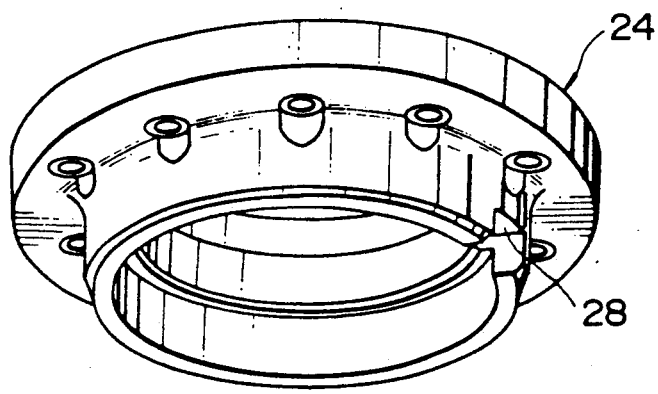
FIG. 2 is a perspective view of a retainer of the swing reduction gear assembly of FIG. 1.

Referring to FIGS. 2 and 5, the retainer 24 on which the oil seal 25 is fitted has an oil passage 28 in the form of a radial groove formed at a lower end portion thereof for passing oil therethrough. The oil passage 28 may otherwise be in the form of a radial through-hole formed in a circumferential wall of the oil seal 25.

Figure 3:
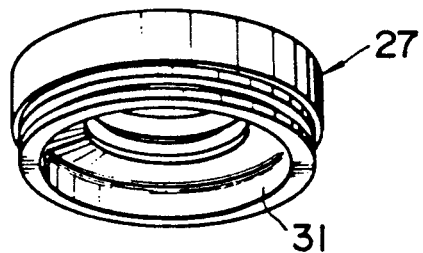
FIG. 3 is a perspective view of a sealing collar of the swing reduction gear assembly of FIG. 1.
Figure 4:
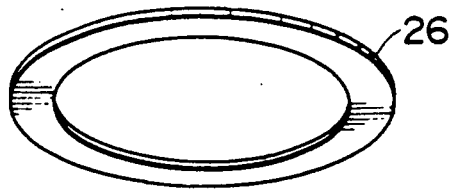
FIG. 4 is a perspective view of a disk-shaped plate of the swing reduction gear assembly of FIG. 1.

Referring now to FIGS. 3 to 5, an oil passage 31 is formed on the inner periphery at a lower end portion of the sealing collar 27. The oil passage 31 may be such a recessed groove as seen in FIG. 5 which may extend over the entire inner periphery or over part of the inner periphery of the sealing collar 27. It is to be noted that, while the sealing collar 15 of the conventional swing reduction gear shown in FIG. 9 is chamfered at the inner periphery of the lower end thereof adjacent a neck portion of the output power shaft a to the pinion 7 to define a small annular spacing therebetween as seen in FIG. 9, the annular spacing does not have such a function of the oil passage 31 as described hereinbelow.

Referring particularly to FIG. 5, when the pinion 7 and the internal gear wheel 11 are rotated in a mutually meshing condition, grease is first held between adjacent teeth of the pinion 7 and the internal gear wheel 11, and as the teeth come nearer and are finally engaged with each other, the oil is squeezed out from between the teeth. The oil thus squeezed out flows in the direction indicated by an arrow mark c and then partly passes through a gap d between an outer periphery of the disk-shaped plate 26 and an inner periphery of a lower end portion of the retainer 24 whereafter it moves in the direction indicated by an arrow mark e. Consequently, the pressing force of the oil acts upon the lower face lip portion 29 of the oil seal 25. In this instance, the lower face side lip portion 29 is held in contact with and slidably moved on the upper face of the disk-shaped plate 26 but acts to prevent the oil from entering the swing reduction gear drive 23. Accordingly, admission of the oil into the swing reduction gear drive 23 is prevented.

By the way, the position where the pinion 7 and the internal gear wheel 11 mesh with each other and hence where oil is squeezed out when the pinion 7 and the internal gear wheel 11 are rotated in a mutually meshing condition is a particular fixed position with respect to the swing reduction gear drive 23. In the swing reduction gear of the embodiment, the oil passage 28 is formed at a location of the lower end portion of the retainer 24 which is spaced a little from the particular fixed position. Consequently, part of the oil squeezed out from between cooperating teeth of the pinion 7 and the internal gear wheel 11 is returned from the location near the lower face side lip portion 29 of the oil seal 25 into the oil tank 12 by way of the oil passage 28. Accordingly, the pressing force of the oil acting upon the lower face side lip portion 29 of the oil seal 25 is reduced, and admission of the oil into the swing reduction gear 23 is prevented more effectively.

Besides, the oil passage 31 formed on the inner periphery at the lower end of the sealing collar 27 allows part of the oil squeezed out as described above to flow therethrough along the upper face of the pinion 7 so that the oil thereafter passes between adjacent teeth of the pinion 7 which are not in a meshing condition and is returned into the oil tank 12. Accordingly, the pressing force of the oil acting upon the lower face side lip portion 29 of the oil seal 25 is reduced, and admission of the oil into the swing reduction gear drive 23 is prevented effectively.

Having now fully described the invention, it will be apparent to one of ordinary skill in the art that many changes and modifications can be made thereto without departing from the spirit and scope of the invention as set forth herein.

What is claimed is:

1. A swing reduction gear assembly for a swing device having an upper structure mounted for swinging movement by way of a swing bearing on a lower structure on which an inner race of said swing bearing is mounted, comprising:
an internal gear wheel formed on said inner race of said swing bearing in a tank for oil for the lubricating of said swing reduction gear assembly;
a swing reduction gear drive having a casing,
an output shaft of said swing reduction gear drive being integrated at a lower end thereof with a pinion meshing with said internal gear,
a lower bearing for supporting said output shaft for rotation on said casing,
a sealing collar fitted on an outer periphery of said output shaft and located at an upper face side of said pinion,
a retainer mounted on said casing at a lower side of said lower bearing,
an oil seal fitted at an inner periphery of said retainer and held in engagement with an outer periphery of said sealing collar, said oil seal having a lower face side lip portion formed thereon, and
a disk-shaped plate mounted to an outer periphery of said sealing collar such that said lower face side lip portion of said oil seal is normally held in contact with an upper face of said disk-shaped plate,
wherein said retainer has an oil passage formed at a lower end portion thereof for passing therethrough part of the oil which is squeezed out from between meshing teeth of said pinion and said internal gear wheel.

2. A swing reduction gear assembly for a swing device having an upper structure mounted for swinging movement by way of a swing bearing on a lower structure on which an inner race of said swing bearing is mounted, comprising:
an internal gear wheel formed on said inner race of said swing bearing in a tank for oil for the lubricating of said swing reduction gear assembly;
a swing reduction gear drive having a casing,
an output shaft of said swing reduction gear drive being integrated at a lower end thereof with a pinion meshing with said internal gear,
a lower bearing for supporting said output shaft for rotation on said casing,
a sealing collar fitted on an outer periphery of said output shaft and located at an upper face side of said pinion,
a retainer mounted on said casing at a lower side of said lower bearing,
an oil seal fitted at an inner periphery of said retainer and held in engagement with an outer periphery of said sealing collar, said oil seal having a lower face side lip portion formed thereon, and
a disk-shaped plate mounted to an outer periphery of said sealing collar such that said lower face side lip portion of said oil seal is normally held in contact with an upper face of said disk-shaped plate,
wherein said sealing collar has an oil passage formed at an inner periphery of a lower end thereof, said oil passage communicating with meshing teeth of said pinion and said internal gear wheel to such an extent that part of the oil which is squeezed out from between the meshing teeth of said pinion and said internal gear wheel is passed therethrough to reach adjacent non-meshing ones of said teeth.

* * * * *